United States Patent
Taguchi et al.

(10) Patent No.: US 11,888,141 B2
(45) Date of Patent: Jan. 30, 2024

(54) AIR BATTERY AND DETECTION DEVICE

(71) Applicant: Nippon Telegraph and Telephone Corporation, Tokyo (JP)

(72) Inventors: Hiroaki Taguchi, Musashino (JP); Takeshi Komatsu, Musashino (JP); Yoko Ono, Musashino (JP); Yuzu Kobayashi, Musashino (JP); Mikayo Iwata, Musashino (JP); Masaya Nohara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/776,293

(22) PCT Filed: Nov. 28, 2019

(86) PCT No.: PCT/JP2019/046525
§ 371 (c)(1),
(2) Date: May 12, 2022

(87) PCT Pub. No.: WO2021/106139
PCT Pub. Date: Jun. 3, 2021

(65) Prior Publication Data
US 2022/0399598 A1 Dec. 15, 2022

(51) Int. Cl.
*H01M 12/06* (2006.01)
*H01M 50/186* (2021.01)
*H01M 50/105* (2021.01)
*H01M 50/103* (2021.01)
*H01M 4/38* (2006.01)
*H01M 4/46* (2006.01)
*H01M 6/50* (2006.01)

(52) U.S. Cl.
CPC ......... *H01M 12/065* (2013.01); *H01M 4/38* (2013.01); *H01M 4/466* (2013.01); *H01M 6/5044* (2013.01); *H01M 12/06* (2013.01); *H01M 50/103* (2021.01); *H01M 50/105* (2021.01); *H01M 50/186* (2021.01)

(58) Field of Classification Search
CPC .. H01M 12/06; H01M 12/065; H01M 50/103; H01M 50/105; H01M 50/186; H01M 4/38; H01M 4/466; H01M 6/5044
See application file for complete search history.

(56) References Cited

U.S. PATENT DOCUMENTS

| | | | |
|---|---|---|---|
| 2011/0200855 A1* | 8/2011 | Watanabe | F03D 9/11 29/623.2 |
| 2011/0300437 A1* | 12/2011 | Yi | H01M 50/645 429/185 |
| 2016/0056477 A1* | 2/2016 | Dannoura | H01M 6/045 429/118 |

OTHER PUBLICATIONS

Aqua Power System Japan, *NOPOPO Water Battery for Disaster*, literature, Jul. 28, 2018, http://www.aps-j.jp/pdf/NWPx3.pdf, pp. 1.

* cited by examiner

*Primary Examiner* — Karie O'Neill Apicella
(74) *Attorney, Agent, or Firm* — Workman Nydegger

(57) ABSTRACT

There is provided an air battery including a first housings accommodating a base cell including a negative electrode, a positive electrode, and a separator disposed between the negative electrode and the positive electrode, and a second housing containing an electrolyte solution or water, in which the first housing and the negative electrode each have a hole leading to the separator, the second housing has a hole that is capable of being sealed, and the first housing and the second housing are disposed to face the hole of the first housing and the hole of the second housing each other.

11 Claims, 8 Drawing Sheets

Fig. 8

| TEST | AVERAGE DISCHARGE VOLTAGE (V) | DISCHARGE CAPACITY (mAh/g) |
|---|---|---|
| EXAMPLE 1 | 1.20 | 1080 |
| EXAMPLE 2 | 1.23 | 1300 |
| EXAMPLE 3 | 0.75 | 500 |
| EXAMPLE 4 | 0.48 | 1050 |
| EXAMPLE 5 | 0.65 | 400 |
| COMPARATIVE EXAMPLE 1 | 1.27 | 130 |
| COMPARATIVE EXAMPLE 2 | 0.80 | 500 |

AIR BATTERY AND DETECTION DEVICE

TECHNICAL FIELD

The present disclosure relates to an air battery and a detection apparatus.

BACKGROUND ART

As a disposable primary battery, an alkaline battery, a manganese battery, an air battery, and the like have been widely used. Furthermore, in recent years, in development of Internet of Things (IoT), there have also been developed distributed sensors that are installed and used anywhere in natural fields, such as in soil or forest, and a small-sized high performance lithium-ion battery compatible with various applications such as these sensors as well as a mobile device in the related art, has become popular.

These commonly used disposable batteries cause self-discharge (natural power generation) because their electrodes are in contact with an electrolyte solution (electrolytic solution). Furthermore, a strong alkali such as sodium hydroxide aqueous solution or an organic electrolytic solution is used as the electrolyte solution, and thus safety and environmental problems are pointed out, whereby there is a problem in that handling is not easy.

In order to solve such a problem, there is known a battery of a type in which water is injected into a battery cell at the time of use (NPL 1).

CITATION LIST

Non Patent Literature

NPL 1: Aqua Power System Japan, "NOPOPO Water Cell for Time of Disaster", searched on Jul. 28, 2016, [online], Internet <URL: http://www.aps-j.jp/pdf/NWPx3.pdf>

SUMMARY OF THE INVENTION

Technical Problem

In an emergency battery for long-term storage of NPL 1, an injection port is provided for adding water at the time of use, but it is necessary to inject water with a dedicated dropper and the injection is difficult. In addition, the emergency battery cannot be used in absence of water to be injected, and it is difficult to adjust an amount of water to be injected, so that there is also a possibility that liquid leakage occurs.

The present disclosure has been made in view of these problems, and an object of the present disclosure is to provide an air battery that is easier to handle and can suppress occurrence of self-discharge before starting use.

Means for Solving the Problem

An air battery according to an aspect of the present disclosure includes a first housing configured to accommodate a base cell including a negative electrode, a positive electrode, and a separator disposed between the negative electrode and the positive electrode, and a second housing configured to contain an electrolyte solution or water, in which the first housing and the negative electrode each have a hole leading to the separator, the second housing has a hole that is capable of being sealed, and the first housing and the second housing are disposed to face the hole of the first housing and the hole of the second housing each other.

An air battery according to an aspect of the present disclosure includes a base cell including a negative electrode, a positive electrode, and a separator disposed between the negative electrode and the positive electrode, and an electrolyte solution or water contained in a separate chamber separated from the base cell in a housing accommodating the base cell, in which the negative electrode has a hole leading to the separator, a partition member that separates the base cell from the electrolyte solution or water within the housing has a hole that is capable of being sealed, and the hole of the partition member is provided to face the hole of the negative electrode.

Effects of the Invention

According to the present disclosure, it is possible to provide an air battery that is easier to handle and can suppress occurrence of self-discharge before starting use.

BRIEF DESCRIPTION OF DRAWINGS

FIG. 8 is a diagram showing test results of Examples and Comparative Examples.

DESCRIPTION OF EMBODIMENTS

Embodiments of the present disclosure are described below with reference to the drawings.

Figure 1:
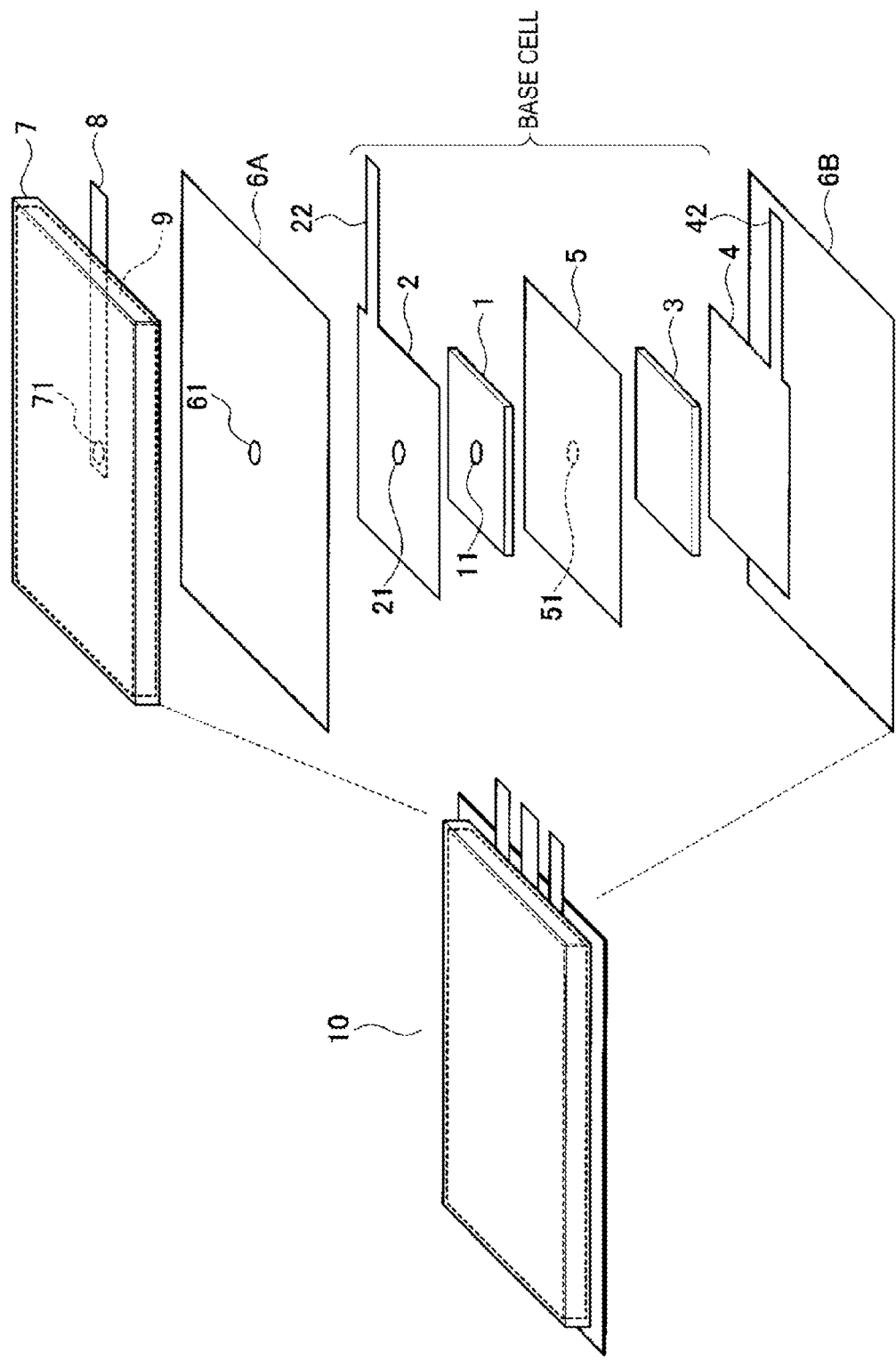
FIG. 1 is a configuration diagram illustrating a configuration of an air battery according to an embodiment of the present disclosure.

FIG. 1 is a configuration diagram illustrating a configuration of an air battery (metal-air primary battery) according to an embodiment of the present disclosure. An air battery is a primary battery using oxygen in the air as a positive electrode active material and a metal as a negative electrode active material.

The air battery illustrated in FIG. 1 includes first housings 6A and 6B that accommodate a base cell (battery cell), a second housing 7 containing an electrolyte solution 9 (electrolytic solution), and a valve 8 (sealing member) that seals a hole of the second housing 7. The base cell includes a negative electrode 1, a positive electrode 3, and a separator 5 disposed between the negative electrode 1 and the positive electrode 3.

The illustrated base cell further includes a negative electrode current collector 2 disposed between the first housing 6A and the negative electrode 1, and a positive electrode current collector 4 disposed between the first housing 6B and the positive electrode 3. The negative electrode current collector 2 has an electrode terminal 22 that is a portion extending from the negative electrode current collector 2, and the electrode terminal 22 is exposed outside the first housings 6A and 6B. Similarly, the positive electrode current collector 4 has an electrode terminal 42 that is a portion extending from the positive electrode current collector 4, and the electrode terminal 42 is exposed outside the first housings 6A and 6B.

The first housing 6A, the negative electrode current collector 2, and the negative electrode 1 of the present embodiment have holes 61, 21, 11, respectively, leading to the separator 5. The second housing 7 has a hole 71 that can be sealed on the side facing the first housing 6A.

In the air battery of the present embodiment, when the valve 8 that seals the hole of the second housing 7 is controlled (for example, removed), the hole of the second housing 7 opens and the electrolyte solution 9 of the second housing 7 drops into and comes into contact with the separator 5 through the respective holes of the second housing 7, the first housing 6A, the negative electrode current collector 2, and the negative electrode 1.

When the electrolyte solution 9 comes into contact with the separator 5, the electrolyte solution 9 housed in the second housing 7 is sucked up spontaneously (autonomously) by capillary action from a portion 51 of the separator 5 corresponding to the holes, and the electrolyte solution 9 is taken into the base cell of the first housing through the separator 5. As a result, the electrolyte solution 9 comes into contact with the positive electrode 3 and the negative electrode 1, which starts discharge (power generation) of the air battery 10. The portion 51 of the separator 5 corresponding to the holes is a portion that is not covered by the first housing 6A, the negative electrode current collector 2, and the negative electrode 1.

The first housings 6A and 6B and the second housing 7 are disposed in a state where the hole 71 of the second housing 7 and the hole 61 of the first housing 6A face each other such that the electrolyte solution 9 flows into the base cell via the hole 71 and the hole 61.

Note that in the example illustrated in FIG. 1, the second housing 7, the first housing 6A, the negative electrode current collector 2, and the negative electrode 1 each have one hole, but each may have a plurality of holes. In addition, each hole needs to have an appropriate opening diameter because it is necessary to gradually supply the electrolyte solution 9 to the separator 5.

The separator 5 only needs to be an insulating body having water absorbing properties. For example, the separator 5 can be a coffee filter, kitchen paper, paper, or the like. When a sheet of a material that is naturally degraded while maintaining strength, such as a cellulose-based separator made of plant fibers, is used for the separator 5, it is possible to reduce the load on the environment.

A conductive material used for a positive electrode of a typical metal-air battery can be used for the positive electrode 3. Representative examples thereof include a carbon material but are not limited to this. The positive electrode 3 can be prepared by a known process such as molding carbon powders with a binder, but in the air battery, it is important to generate a lot of reaction sites inside the positive electrode, and the positive electrode 3 preferably has a high specific surface area.

In a case of a positive electrode prepared by molding carbon powders with a binder to make pellets, the binding strength between carbon powders decreases when a specific surface area is increased to deteriorate the structure, which makes it difficult to discharge stably, whereby the discharge capacity decreases. In contrast, for example, when a positive electrode having a three-dimensional network structure is used, it is not necessary to use a binder, and the discharge capacity can be increased.

The positive electrode 3 may also carry a catalyst. The catalyst is not particularly limited, but preferably includes at least one metal of Fe, Mn, Zn, Cu, or Mo, or a metal oxide including at least one metal of Ca, Fe, Mn, Zn, Cu, or Mo. As the metal, it is preferably Fe, Mn, or Zn, and preferably includes an oxide including one of these or a complex oxide including two or more of these.

Next, the negative electrode 1 will be described. The negative electrode 1 is composed of a negative electrode active material. The negative electrode active material is not limited as long as it is a material that can be used as a negative electrode material for the air battery. For example, the negative electrode 1 may include at least one selected from the group consisting of magnesium, zinc, aluminum, and iron. Specifically, one or more metals selected from magnesium, zinc, aluminum, and iron, or an alloy including one or more metals selected from these metals as a main component may be used for the negative electrode 1. The negative electrode 1 can be formed by a known method. For example, a plate or foil of a commercially available metal or alloy can be formed into a predetermined shape and used.

For the positive electrode current collector 4, a known material can be used. For example, a carbon sheet, a carbon cloth, a Fe plate, a Cu plate, an Al plate, or the like may be used. For the negative electrode current collector 2, a known material can also be used. When a metal is used for the negative electrode 1, an electrode terminal may be drawn outward directly from the negative electrode 1 without the negative electrode current collector 2 provided.

The electrolyte solution 9 is a solution including an electrolyte. The electrolyte is not particularly limited as long as the electrolyte is a substance capable of transporting metal ions and hydroxide ions between the positive electrode 3 and the negative electrode 1. For example, the electrolyte preferably includes magnesium acetate, sodium chloride, potassium chloride, or the like. However, in consideration of environmental impact, a neutral electrolyte is preferably used for the electrolyte.

In order to have a water holding role, the electrolyte solution 9 may include agar, cellulose, a water-absorbing polymer, or the like. The electrolyte solution 9 may also be an electrolyte gel.

Here, as to an electrode reaction in the positive electrode 3 and the negative electrode 1, a case of an air battery in which magnesium metal is used for the negative electrode 1 will be described as an example. In the positive electrode reaction, oxygen in the air and the electrolyte come into contact with each other on a surface of the positive electrode 3 having electrical conductivity to cause the reaction represented by Formula (1) to proceed. On the other hand, in the negative electrode reaction, in the negative electrode 1 in contact with the electrolyte supplied by the separator 5, the reaction of Formula (2) proceeds, and magnesium composing the negative electrode 1 emits electrons to be dissolved as magnesium ions in the electrolyte. These reactions allow for discharge. The total reaction is represented by Formula (3), which is a reaction generating (precipitating) magnesium hydroxide. The theoretical electromotive force is about 2.7 V.

$$\tfrac{1}{2}O_2 + H_2O + 2e^- \rightarrow 2OH^- \tag{1}$$

$$Mg \rightarrow Mg^{2+} + 2e^- \tag{2}$$

$$Mg + \tfrac{1}{2}O_2 + H_2O + 2e^- \rightarrow Mg(OH)_2 \tag{3}$$

In this way, in the air battery, the reaction represented by Formula (1) proceeds on the surface of the positive electrode 3 and thus it is considered to be better to generate a lot of reaction sites inside the positive electrode 3.

A material and a shape used for the first housings 6A and 6B are not limited as long as the first housings 6A and 6B are capable of holding the base cell therein. For example, a known laminate film type housing can be used for the first housings. Furthermore, a material that is naturally degraded, such as a natural product, a microbial product, or a chemical synthetic product, can be used for the first housings. For example, the first housings can be composed of polylactic acid, polycaprolactone, polyhydroxyalkanoate, polyglycolic acid, modified polyvinyl alcohol, casein, modified starch, or the like. In particular, it is preferable to use a chemical synthetic product such as a plant-derived polylactic acid for the first housing. Alternatively, as a material applicable to the first housings, in addition to a commercially available biodegradable plastic and a film thereof, paper used in a milk pack and the like on which a film of a resin such as polyethylene is formed, an agar film, or the like can be used.

By bonding the first housings to each other at peripheral edges, it is possible to seal an interior of the base cell. Examples of the bonding method include a use of a heat seal or an adhesive but are not limited to this. When bonding with a heat seal is difficult, it is preferable to use an adhesive. In addition, an air hole is provided in the first housings in advance, or a portion of the peripheral edges is opened without bonding, so that air can be taken into.

The shape of each of the first housings is not limited to the shape illustrated in FIG. 1 as long as the shape is obtained by processing a biodegradable plastic.

A material and a shape used for the second housing 7 are not limited as long as the second housing 7 is capable of containing the electrolyte solution 9. The material composing the second housing 7 is similar to that of the first housings, and the shape of the second housing 7 is not limited to the shape illustrated in FIG. 1, either.

The first housings 6A, 6B, and the second housing 7 are disposed such that their holes face each other and are integrated to fabricate the air battery. Specifically, the first housings 6A and 6B and the second housing 7 are joined and integrated using, for example, an adhesive, in such a manner that the position of the hole 71 of the second housing 7 closed by the valve 8 overlaps with the position of the hole 61 of the first housing 6A.

The air battery composed of a material that is naturally degraded can be used as a disposable primary battery. Such a disposable primary battery, when used in a disposable device such as, for example, a soil moisture sensor, is naturally degraded over time, thereby eliminating the need to recover the battery. In addition, such an air battery is composed of a naturally occurring material or a fertilizer component, and thus a load on the environment is extremely low even when used in natural fields such as in forest or undersea as well as in soil.

Note that shapes of the negative electrode 1, the negative electrode current collector 2, the positive electrode 3, the positive electrode current collector 4, the separator 5, the first housings 6A and 6B, and the second housing 7 are not limited as long as the arrangement of these for operating as an air battery is not impaired. For example, a rectangular or circular sheet shape in a plan view or a rolled shape can be used.

Next, modification examples of the air battery 10 according to the embodiment illustrated in FIG. 1 will be described.

Modification Example 1

Figure 2:
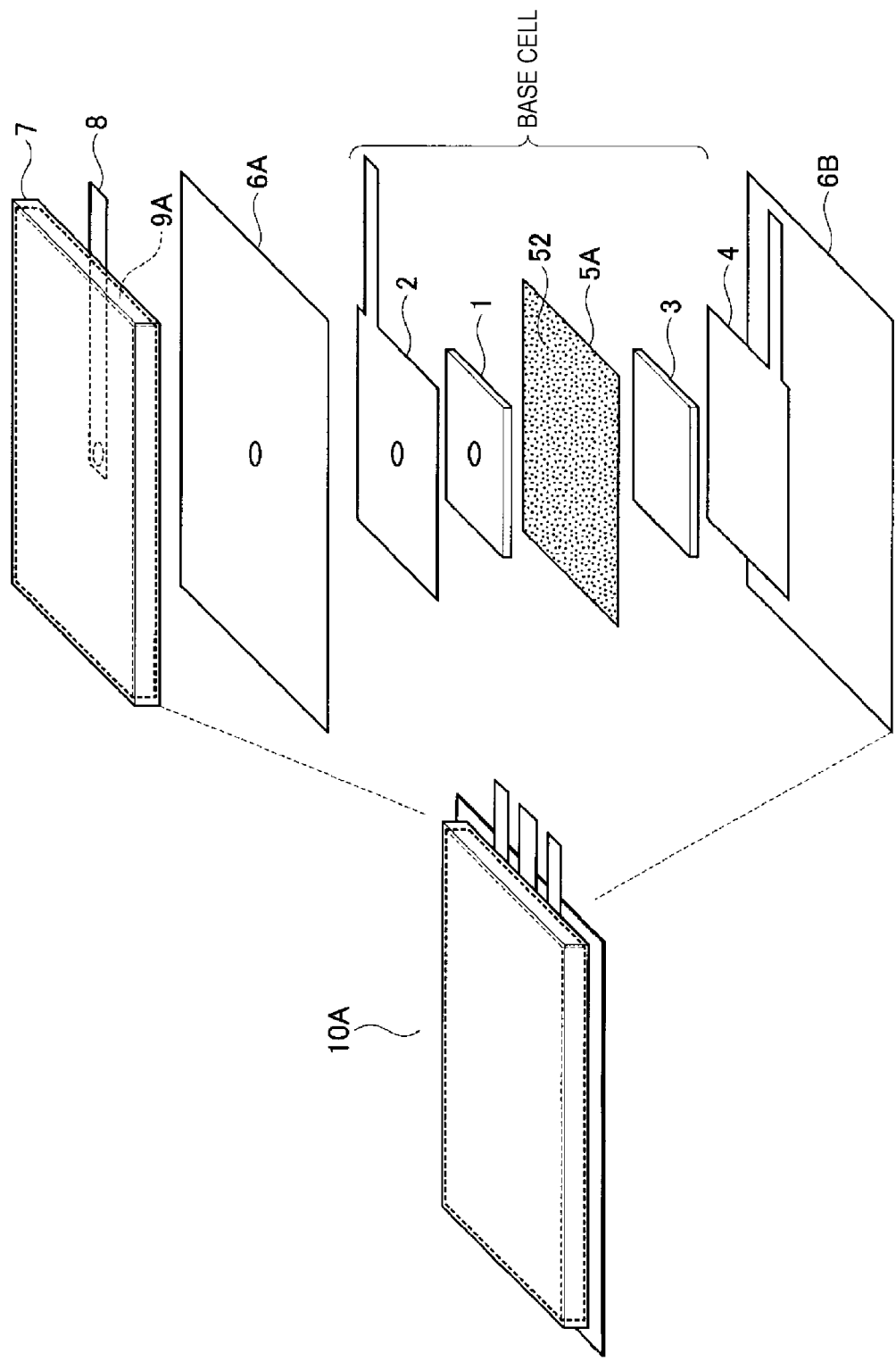
FIG. 2 is a configuration diagram illustrating a configuration of an air battery of Modification Example 1.

FIG. 2 is a diagram illustrating a configuration of an air battery 10A according to Modification Example 1 of the present embodiment. The air battery 10A of the present modification example is different from the air battery 10 of the first embodiment in that water 9A is contained instead of the electrolyte solution 9 in the second housing 7, and a separator 5A contains an electrolyte 52, and is otherwise similar to the air battery 10 of the first embodiment.

In a case where the separator 5A contains the electrolyte 52, when the water 9A of the second housing 7 is sucked up from a portion of the separator 5A corresponding to the hole, the air battery 10A of the present modification example starts discharge (power generation). As with the present embodiment illustrated in FIG. 1, when the valve 8 of the second housing 7 is controlled to open the hole 71, the water 9A of the second housing 7 is sucked up to the separator 5A.

Modification Example 2

Figure 3:
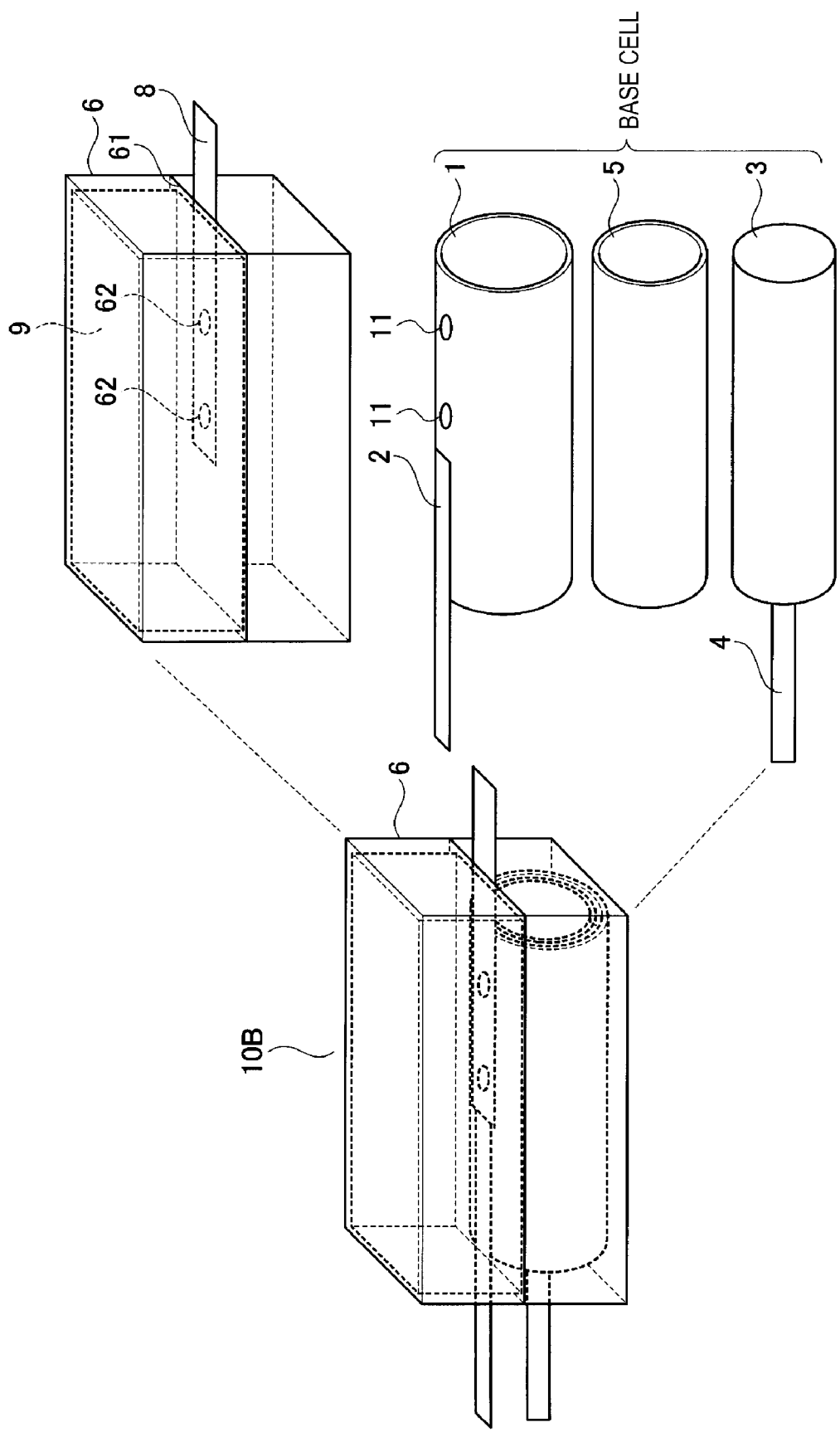
FIG. 3 is a configuration diagram illustrating a configuration of an air battery of Modification Example 2.
Figure 4:
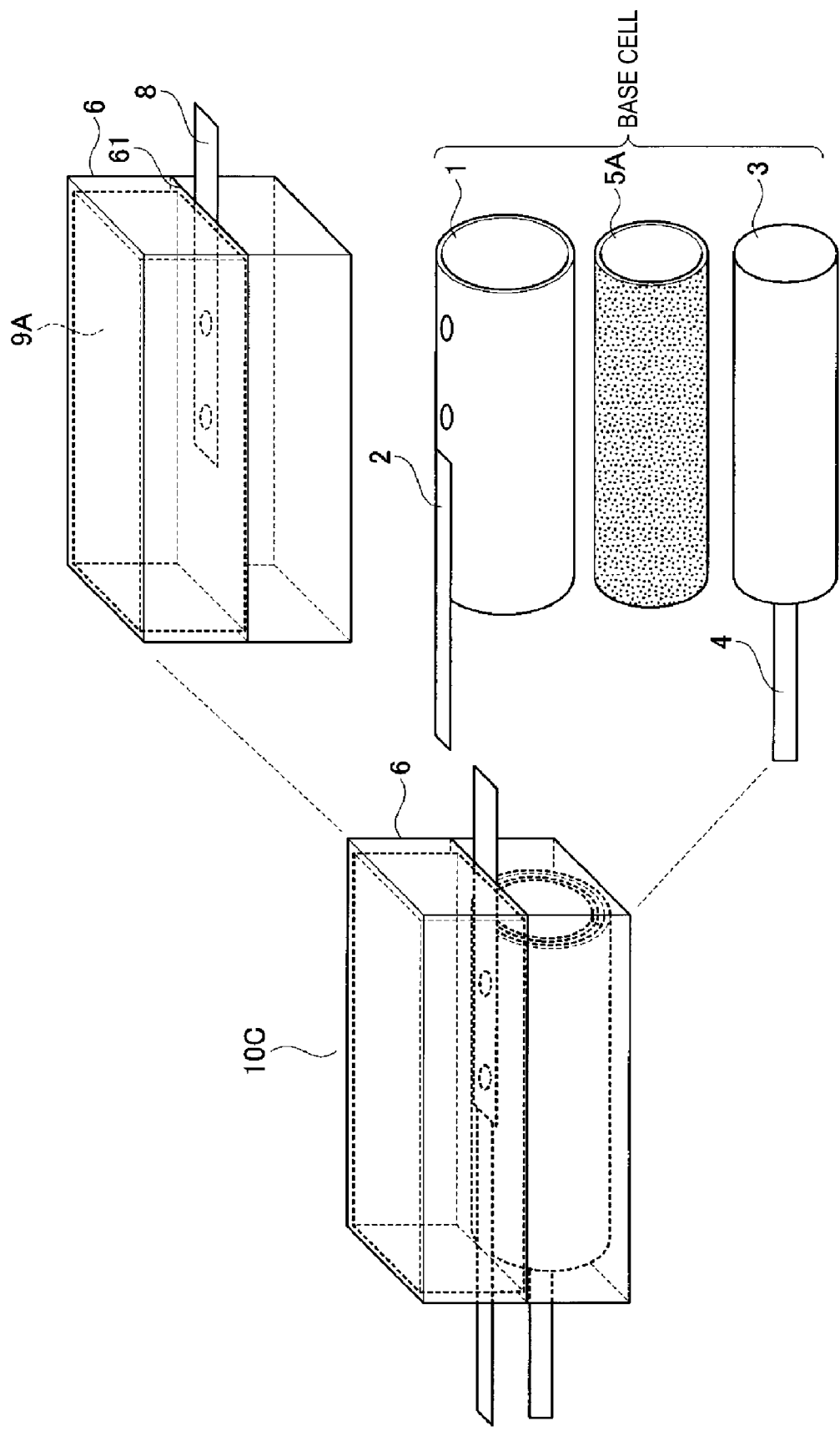
FIG. 4 is a configuration diagram illustrating a configuration of an air battery of a modified example of Modification Example 3.

FIG. 3 is a diagram illustrating a configuration of an air battery 10B according to Modification Example 2 of the present embodiment. In the air battery 10B of the present modification example, an interior of one housing 6 is partitioned into two spaces (chambers) with a partition member 61, the base cell is accommodated in one of the spaces, and the electrolyte solution 9 is accommodated in the other of the spaces.

Specifically, the air battery 10B includes the base cell and the electrolyte solution 9 that is contained in a separate chamber separated from the base cell in the housing 6 accommodating the base cell. The housing 6 includes the partition member 61 that separates the base cell and the electrolyte solution within the housing. The partition member 61 has at least one hole 62 that can be sealed. The air battery 10B includes the valve 8 that seals the hole 62 of the partition member 61.

The base cell includes at least the negative electrode 1, the positive electrode 3, and the separator 5 disposed between the negative electrode 1 and the positive electrode 3. The illustrated base cell further includes the negative electrode current collector 2 attached to the negative electrode 1, and the positive electrode current collector 4 attached to the positive electrode 3. The negative electrode 1 has at least one hole 11 leading to the separator 5. The negative electrode current collector 2 may also have a hole leading to the separator 5.

In the base cell of Modification Example 2, the separator 5 having a hollow cylindrical shape is disposed inside the negative electrode 1 having a hollow cylindrical shape, and the positive electrode 3 is disposed inside the separator 5. The hole 62 of the partition member 61 of the housing 6 is provided so as to face the hole 11 of the negative electrode 1.

In the present modification example as well, similarly to the embodiment, the valve 8 (sealing member) is controlled to open the hole 62 of the partition member 61, and the electrolyte solution 9 contained in the separate chamber within the housing 6 comes into contact with the separator 5 via the hole 62 of the partition member 61 and the hole 11 of the negative electrode 1, whereby the electrolyte solution is spontaneously taken into the base cell due to the capillary action to start discharge (power generation).

Modification Example 3

FIG. 3 is a diagram illustrating a configuration of an air battery 10C of Modification Example 3 of the present embodiment. The air battery 10C of the present modification example is different from the air battery 10B of Modification Example 2 in that the water 9A is contained in the housing 6 instead of the electrolyte solution 9, and the separator 5A contains an electrolyte, and is otherwise similar to the air battery 10B of Modification Example 2.

Detection Apparatus

Next, a detection apparatus using the air battery of the present embodiment will be described.

Figure 5:
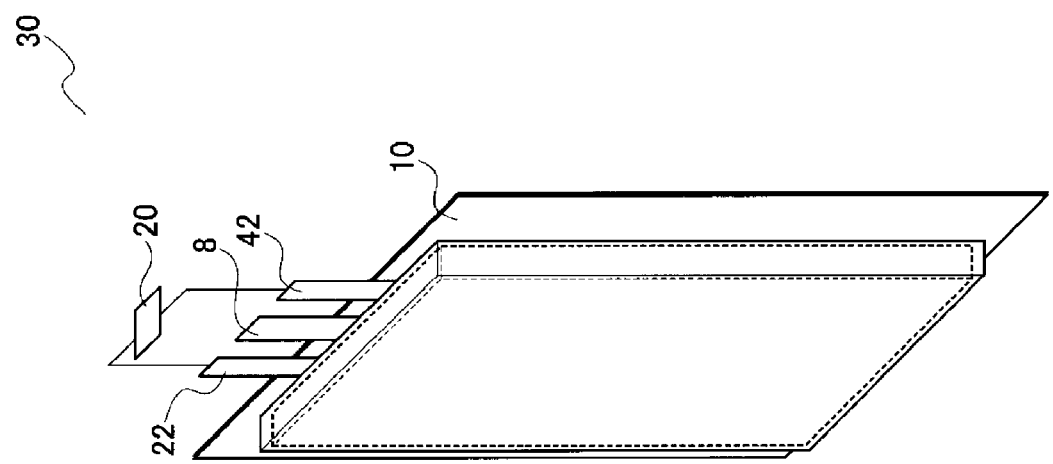
FIG. 5 is a configuration diagram illustrating a configuration of a detection apparatus using an air battery.

FIG. 5 is a diagram schematically illustrating a detection apparatus according to the present embodiment. A detection apparatus 30 illustrated includes an air battery 10 and a detector 20. The air battery 10 may be the air battery 10 of the present embodiment illustrated in FIG. 1 or any of the air batteries 10A, 10B, 10C of Modification Examples 1 to 3.

The electrode terminal 22 of the negative electrode current collector and the electrode terminal 42 of the positive electrode current collector that are exposed from the housings of the air battery 10 are disposed without being in contact with each other. These electrode terminals 22 and 24 are connected to the detector 20 by a lead wire or the like and become electrodes of the detector 20. When the hole is opened by controlling the valve 8, the two electrode terminals 22, 42 are connected via the detector 20 to constitute a circuit.

When the valve 8 is controlled, the electrolyte solution or water is supplied to the separator via the hole to start discharge of the air battery 10, whereby the detector 20 detects conduction between the electrode terminals 22, 24. In other words, the detector 20 detects electrode reactions (the above-described (1) to (3) electrical formulas) in the positive electrode 3 and the negative electrode 1. When the valve 8 seals the hole, the two electrode terminals 22, 42 are insulated from each other.

Upon detecting the conduction between the electrode terminals 22 and 24, the detector 20 performs a predetermined detection operation. The detector 20 may be, for example, a notification apparatus that makes a notification that the sealed hole is opened by removing the valve 8. In this case, when it is detected that the hole has been opened, the notification apparatus may perform a notification operation such as notifying the circumference by sounding a high-volume alarm or notifying a remote device by emitting a radio wave.

If the detector 20 is also composed of a naturally occurring material or a fertilizer component, the load on the environment is extremely low even when used in natural fields such as in the forest or undersea as well as in soil.

Experiments were conducted to evaluate the air battery of the present embodiment described above. Hereinafter, examples of the air battery used in the experiments will be described.

Example 1

In Example 1, a carbon nanofiber was used for the positive electrode to fabricate the air battery illustrated in FIG. 1.

Fabrication of Air Battery

First, a method for preparing the positive electrode will be described. A commercially available carbon nanofiber sol [dispersion medium: water ($H_2O$), 0.4 wt %, available from Sigma-Aldrich] was placed in a test tube and the test tube was immersed in liquid nitrogen for 30 minutes to fully freeze the carbon nanofiber sol. After the carbon nanofiber sol was completely frozen, the frozen carbon nanofiber sol was taken out in an eggplant flask and dried in a vacuum of 10 Pa or less by a freeze dryer (available from TOKYO RIKAKIKAI CO, LTD), whereby an elasticized monolith having a three-dimensional network structure including carbon nanofibers was obtained. The positive electrode was made by punching this elasticized monolith with a punch to have a circular size with a diameter of 17 mm.

A carbon cloth was used for the positive electrode current collector, and the carbon cloth was cut into a shape having a tab for current collection in a portion of a 20 mm×20 mm square.

The negative electrode was prepared by cutting a commercially available magnesium alloy plate AZ31B (thickness of 300 μm, available from NIPPON KINZOKU CO., LTD.) with scissors to have a shape having a tab (electrode terminal) for current collection in a portion of a 20 mm×20 mm square. In Example 1, the negative electrode includes the tab without the negative electrode current collector 2 provided. The negative electrode also has a hole of φ2 mm to cause the electrolyte solution to pass through.

As the separator, a cellulose-based separator (available from NIPPON KODOSHI CORPORATION) for a battery was cut into a square shape of 20 mm×20 mm and used. The separator also has a hole of φ2 mm to cause the electrolyte solution to pass through.

As the electrolyte solution accommodated in the second housing, a solution in which sodium chloride (NaCl, available from Kanto Chemical Co., Inc.) was dissolved in pure water at a concentration of 1 mol/L was used.

A film sheet ECOLOJU (available from Mitsubishi Plastics, Inc.) was used as the material of the first housings. Two cut sheets were prepared by cutting this sheet into 30 m×30 mm in a plan view. Then, one of the cut sheets was used as the first housing to be proximate to the negative electrode, and the other of the cut sheets was used as the first housing to be proximate to the positive electrode.

The negative electrode and the separator each having a hole of φ2 mm for causing the electrolyte solution to pass through are disposed on the first housing to be proximate to the negative electrode. On top of this, the positive electrode, the positive electrode current collector, and the first housing to be proximate to the positive electrode are sequentially disposed. Then, the peripheral edges of the two first housings were sealed by heat sealing at 130° C. using a sealer to produce a first housing in which the base cell was accommodated. At this time, only a portion (approximately 10 mm) of the peripheral edges of the first housings was not sealed to provide an air hole.

For the second housing as well, a housing was used in which two cut sheets obtained by cutting the film sheet ECOLOJU similar to that of the first housings were used and three sides of peripheral edges of the cut sheets were heat-sealed. An electrolyte solution was injected into the second housing and then the remaining one side was heat-sealed. Then, a hole of 2 mm for flowing out the electrolyte solution was made in the heat-sealed housing, and the valve using the film sheet ECOLOJU was then heat-sealed so as to close a location where the hole was made. Note that a size, a shape, and the number of holes do not matter as long as the electrolyte solution can be supplied to the separator.

The laminated first housing and the laminated second housing were finally integrated to fabricate an air battery. Here, the first housing and the second housing are joined and integrated in such a manner that the position of the hole closed by the valve of the second housing overlaps with the hole of the first housing (such that the two holes face each other). The total weight of the air battery thus obtained was about 2 g.

Evaluation of Battery

The battery performance of the air battery of Example 1 was measured. First, voltage change between the positive electrode and the negative electrode was measured when the valve sealing the hole of the second housing was removed and 1 mol/l NaCl aqueous solution as the electrolyte solution was sucked up by the separator.

Figure 6:
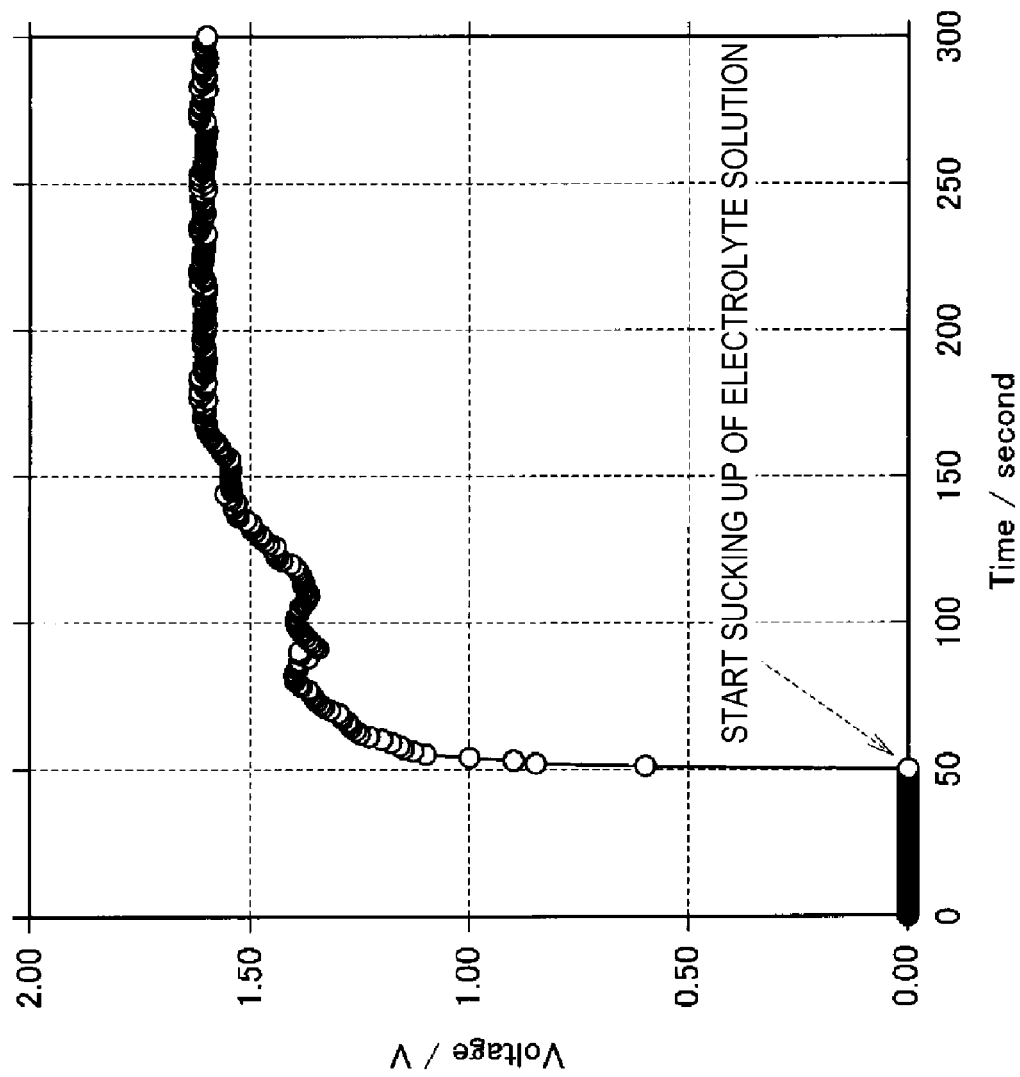
FIG. 6 is a diagram illustrating a change in voltage when an electrolyte solution is sucked up in an air battery.

FIG. 6 is a diagram showing measurement results of the voltage change between the positive electrode and the negative electrode (voltage change of the air battery) when the electrolyte solution is sucked up. When the separator sucked up the electrolyte solution, the voltage rose, and a steady voltage was obtained at about 200 seconds from the start of sucking up. The voltage at this time was 1.6 V.

A discharge test was then conducted. In the discharge test of the air battery, a commercially available charge/discharge measurement system (available from HOKUTO DENKO CORPORATION, SD8 Charge/Discharge System) was used, energization was conducted at a current density per effective area of the positive electrode of 2.0 mA/cm$^2$, and the measurement was performed until the battery voltage dropped from the open circuit voltage to 0 V. The discharge test of the battery was conducted in a constant temperature chamber at 25° C. (the atmosphere is in a normal living environment) while the electrolyte solution of the second housing was supplied, via a hole leading to the separator, to the portion of the separator corresponding to the hole.

Figure 7:
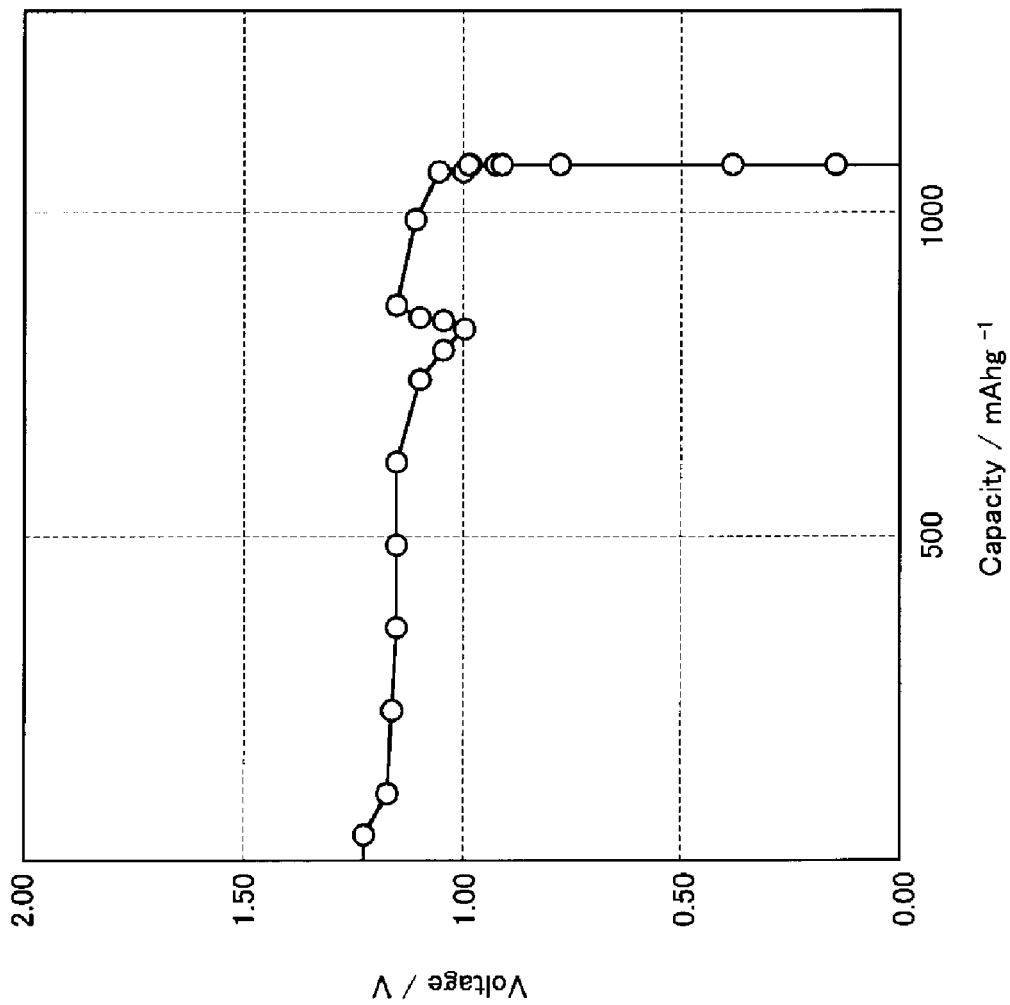
FIG. 7 is a diagram illustrating a discharge curve of an air battery.

FIG. 7 shows a discharge curve that is a result of the first discharge test. The discharge capacity was expressed as a value per weight of the positive electrode (mAh/g) composed of a monolith. As shown, it can be seen that the average discharge voltage was 1.2 V and the discharge capacity was 1080 mAh/g.

Example 2

Example 2 is the air battery illustrated in FIG. 2. The air battery of Example 2 differs from that of Example 1 in that an electrolyte-containing separator is used, and is otherwise similar to that of Example 1.

The electrolyte-containing separator was obtained by immersing the separator of Example 1 in an electrolyte solution for 30 minutes to cause the separator to carry NaCl as the electrolyte and drying the separator in air for one hour.

The discharge test was conducted while the water of the second housing was supplied, via a hole leading to the separator, to a portion of the separator corresponding to the hole. In Example 2, the average discharge voltage was 1.23 V, and the discharge capacity was 1300 mAh/g.

Note that when the battery was installed in the soil after discharge, degradation of the housing was visually confirmed in approximately one month. It was demonstrated that the air battery was metabolized and degraded by microorganisms in the soil.

Examples 3 to 5

In each of Examples 3 to 5, only the metal used for the negative electrode was different from that of Example 2, and the air battery was otherwise produced and evaluated in the similar manner as in Example 2. A commercially available metal zinc plate (thickness of 200 μm, available from The Nilaco Corporation) was used for a negative electrode of Experiment Example 3. An aluminum plate (thickness of 200 μm, available from The Nilaco Corporation) was used for the negative electrode of Example 4. A steel plate (thickness of 200 μm, available from The Nilaco Corporation)(was used for the negative electrode of Example 5. It was confirmed that all the air batteries of Examples 3 to 5 operated as the air battery.

Comparative Example 1

Comparative Example 1 differs from Examples 1 and 2 in that neither electrolyte solution nor water was contained in the housing and a separator in a wet state obtained by immersing the separator in the electrolyte solution in advance was put into the housing and sealed. As the separator of Comparative Example 1, a cellulose-based separator for a battery (available from NIPPON KODOSHI CORPORATION) was cut into a square of 20 mm×20 mm and used.

The negative electrode and the separator subjected to wetting by injecting the electrolyte solution were disposed on the housing to be proximate to the negative electrode. On top of this, the positive electrode, the positive electrode current collector, and the housing to be proximate to the positive electrode were sequentially covered, and four sides of the peripheral edges of the two housings were sealed by heat sealing at 130° C. using a sealer. At this time, only a portion (approximately 10 mm) of the peripheral edges of the housings was not sealed to provide an air hole.

An air battery fabricated using the separator subjected to wetting by a certain amount of the electrolyte solution in advance in this way had an average discharge voltage of 1.27 V, and a discharge capacity of 130 mAh/g, and the discharge capacity significantly decreased as compared to Examples 1 and 2.

Comparative Example 2

Comparative Example 2 differs from Example 2 in that only a portion (approximately 10 mm) of the peripheral edges of the housings was not sealed to provide an air hole and then water (tap water) was injected from the air hole. That is, in Experiment Example 2, water is contained in the second housing in advance, whereas in Comparative Example 2, water is not contained in the housing and water is injected into the housing at the time of use.

The negative electrode and the electrolyte-containing separator were disposed on the housing to be proximate to the negative electrode. On top of this, the positive electrode, the positive electrode current collector, and the housing to be proximate to the positive electrode were sequentially covered, and four sides of the peripheral edges of the two housings were heat-sealed at 130° C. using a sealer. At this time, only a portion (approximately 10 mm) of the peripheral edges of the housings was not sealed to provide an air hole.

An air battery fabricated by injecting a sufficient amount of water (3 mL) from the air hole with a dropper had an average discharge voltage of 0.80 V and a discharge capacity of 500 mAh/g. In the air battery of Comparative Example 2, the discharge voltage and capacity were decreased as compared to Example 2.

FIG. 8 shows test results of the Examples and Comparative Examples. As shown, it was confirmed that the air batteries using magnesium metal for the negative electrodes of Examples 1 and 2 each exhibited a discharge capacity of 1000 mAh/g or higher. It was confirmed that the air batteries using a metal other than magnesium (zinc, aluminum, iron) for the negative electrodes of Examples 3 to 5 also operate as a battery.

In the case of the air battery of Comparative Example 1, the discharge capacity is 130 mA/g which is low. This is thought to be because while the electrolyte solution is supplied to the separator via the hole leading to the separator in a just amount as needed in the air battery of the present embodiment, the separator subjected to wetting with the electrolyte solution in advance is accommodated in the housing and the amount of the electrolyte solution is not sufficient in Comparative Example 1.

In the case of the air battery of Comparative Example 2, the average discharge voltage and the discharge capacity were decreased as compared to Example 2. This is thought to be because in Comparative Example 2, both surfaces of each of the negative electrode and the positive electrode come into contact with the electrolyte solution by injecting water with a dropper, and thus corrosion of the negative electrode was observed and the positive electrode had a reduced area in contact with air as compared to the case of Example 2, thereby reducing the discharge capacity. The reduction in average discharge voltage is thought to be because the contact of the positive electrode, the separator, and the negative electrode was poor.

From the experimental results described above, it was demonstrated that the air battery of the present embodiment has an excellent discharge average voltage and discharge capacity.

As described above, in the present embodiment, the electrolyte solution or water constituting the air battery is contained in advance in a space different from the base cell within the housing. This eliminates the need to inject these liquids into the air battery when a user uses the air battery and the need to obtain these liquids at the time of use.

As described above, according to the present embodiment, it is possible to suppress a side reaction such as corrosion of the negative electrode in the air battery, and because the electrolyte solution or water is stored in a separate chamber before use, it is possible to use the air battery even in absence of water, thereby allowing the user to handle the air battery more easily.

In addition, in the air battery of the present embodiment, when the hole is opened by performing control such as opening the valve at the time of use and then the electrolyte solution or water is brought into contact with the separator via the hole, the electrolyte solution or water is spontaneously introduced into the base cell by the capillary action to start discharge (power generation). As a result, in the present embodiment, effects are achieved that there is no self-discharge before use, an amount of the electrolyte solution or water supplied to the separator at the time of use is small so that there is no concern of liquid leakage, and handling is easy. That is, in the present embodiment, it is easy to handle, and it is possible to suppress the occurrence of self-discharge before starting use.

In the present embodiment, it is possible to increase the discharge capacity of the air battery because the structure in which the electrolyte solution or water is always sucked up from the housing during discharge is employed.

The detection apparatus of the present embodiment includes an air battery and a detector configured to detect power generation of the air battery. The detector opens the valve provided in the housing of the air battery and detects that the electrolyte solution or water is sucked up into a separator portion within the housing by capillary action, causing an electromotive force that allow for power generation, thereby allowing a predetermined detection operation to be performed.

The present disclosure is not limited to the embodiment and modification examples described above and various modifications and combinations can be made within the scope of the gist of the present disclosure.

REFERENCE SIGNS LIST

10, 10A, 10B, 10C: Air battery
1: Negative electrode
2: Negative electrode current collector
3: Positive electrode
4: Positive electrode current collector
5, 5A: Separator
51: Electrolyte
6: Housing
6A, 6B: First housing
7: Second housing
8: Valve (sealing member)
9: Electrolyte solution
9A: Water
20: Detector
30: Detection apparatus

The invention claimed is:

1. An air battery comprising:
a first housing configured to accommodate a base cell including a negative electrode, a positive electrode, and a separator disposed between the negative electrode and the positive electrode; and
a second housing configured to contain an electrolyte solution or water, wherein
the first housing and the negative electrode each have a hole leading to the separator,
the second housing has a hole that is capable of being sealed,
the first housing and the second housing are disposed in a state where the hole of the first housing and the hole of the second housing face each other,
the hole of the second housing, the first housing, and the negative electrode are aligned such that the electrolyte solution or water contained in the second housing can come into contact with the separator, and
the base cell is nested inside the first and second housing.

2. The air battery according to claim 1, further comprising:
a sealing member configured to seal the hole of the second housing, wherein
when the sealing member is controlled to open the hole of the second housing, the electrolyte solution or water comes into contact with the separator via the hole of the first housing and the hole of the negative electrode to start power generation.

3. The air battery according to claim 1, wherein
the second housing contains water, and
the separator includes an electrolyte.

4. An air battery comprising:
a base cell including a negative electrode, a positive electrode, and a separator disposed between the negative electrode and the positive electrode; and
an electrolyte solution or water contained in a separate chamber separated from the base cell in a housing accommodating the base cell, wherein
the negative electrode has a hole leading to the separator, a partition member that separates the base cell from the electrolyte solution or water within the housing has a hole that is capable of being sealed, the hole of the partition member is provided to face the hole of the negative electrode, the hole of the partition member and the negative electrode are aligned such that the electrolyte solution or water contained in the second housing can come into contact with the separator, and the base cell and the partition are nested inside the housing.

5. The air battery according to claim 4, further comprising:

a sealing member configured to seal the hole of the partition member, wherein when the sealing member is controlled to open the hole of the partition member, the electrolyte solution or water comes into contact with the separator via the hole to start power generation.

6. The air battery according to claim 4, wherein
the separate chamber contains water, and
the separator includes an electrolyte.

7. The air battery according to claim 1, wherein the negative electrode includes at least one selected from the group consisting of magnesium, zinc, aluminum, and iron.

8. A detection apparatus, comprising:
the air battery described in claim 1; and
a detector configured to detect power generation of the air battery.

9. The air battery according to claim 5, wherein
the separate chamber contains water, and
the separator includes an electrolyte.

10. The air battery according to claim 4, wherein the negative electrode includes at least one selected from the group consisting of magnesium, zinc, aluminum, and iron.

11. A detection apparatus, comprising:
the air battery described in claim 4; and
a detector configured to detect power generation of the air battery.

* * * * *